Figure 1:
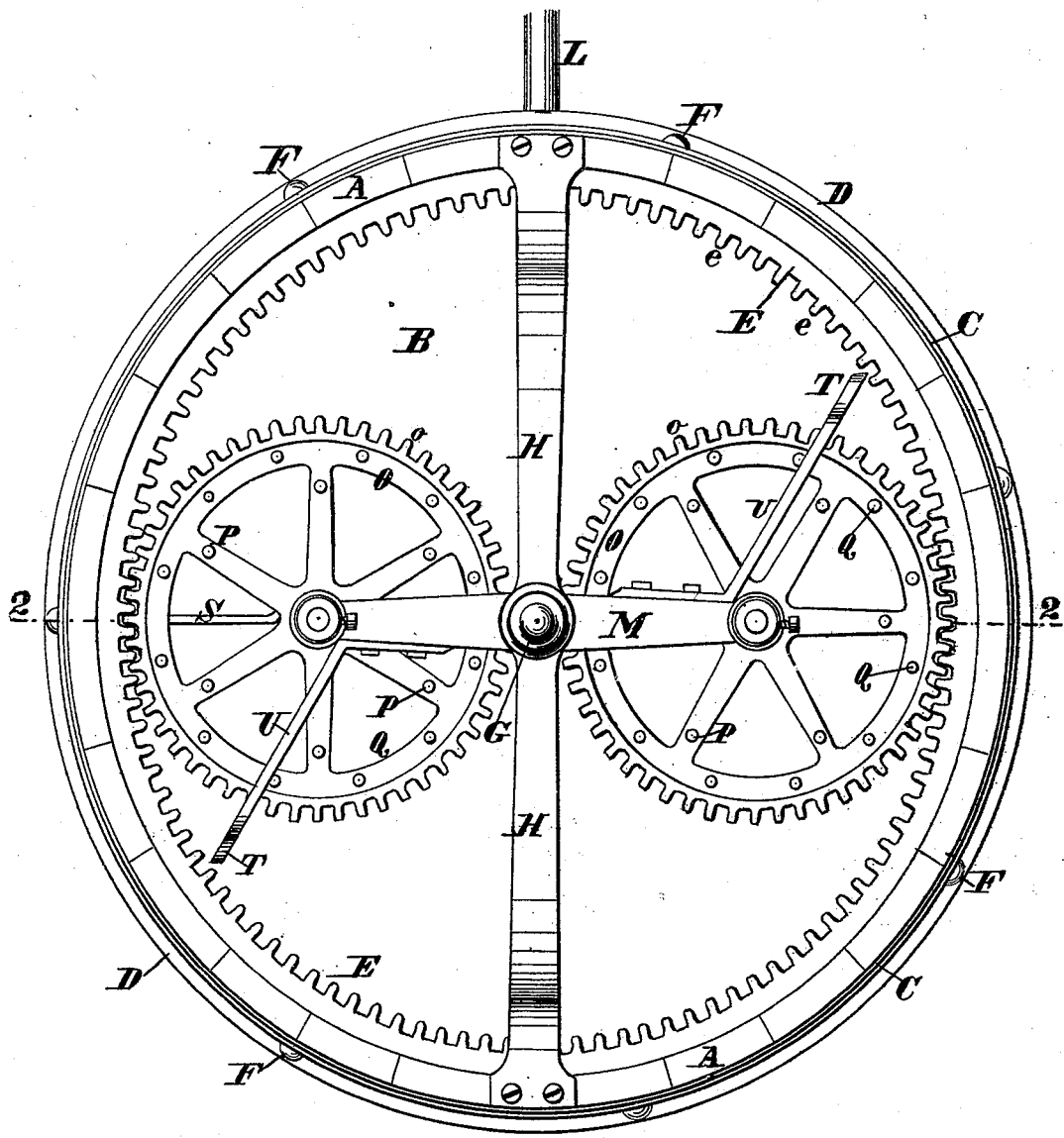

2 Sheets—Sheet 1.

T. A. McINTYRE.
MASHING-MACHINE.

No. 171,832. Patented Jan. 4, 1876.

WITNESSES
F. E. Smith
Henry Tanner

INVENTOR
Thomas A. McIntyre
By Knight Bros, Attorneys

N. PETERS, PHOTO-LITHOGRAPHER, WASHINGTON, D. C.

2 Sheets—Sheet 2.
T. A. McINTYRE.
MASHING-MACHINE.
No. 171,832. Patented Jan. 4, 1876.
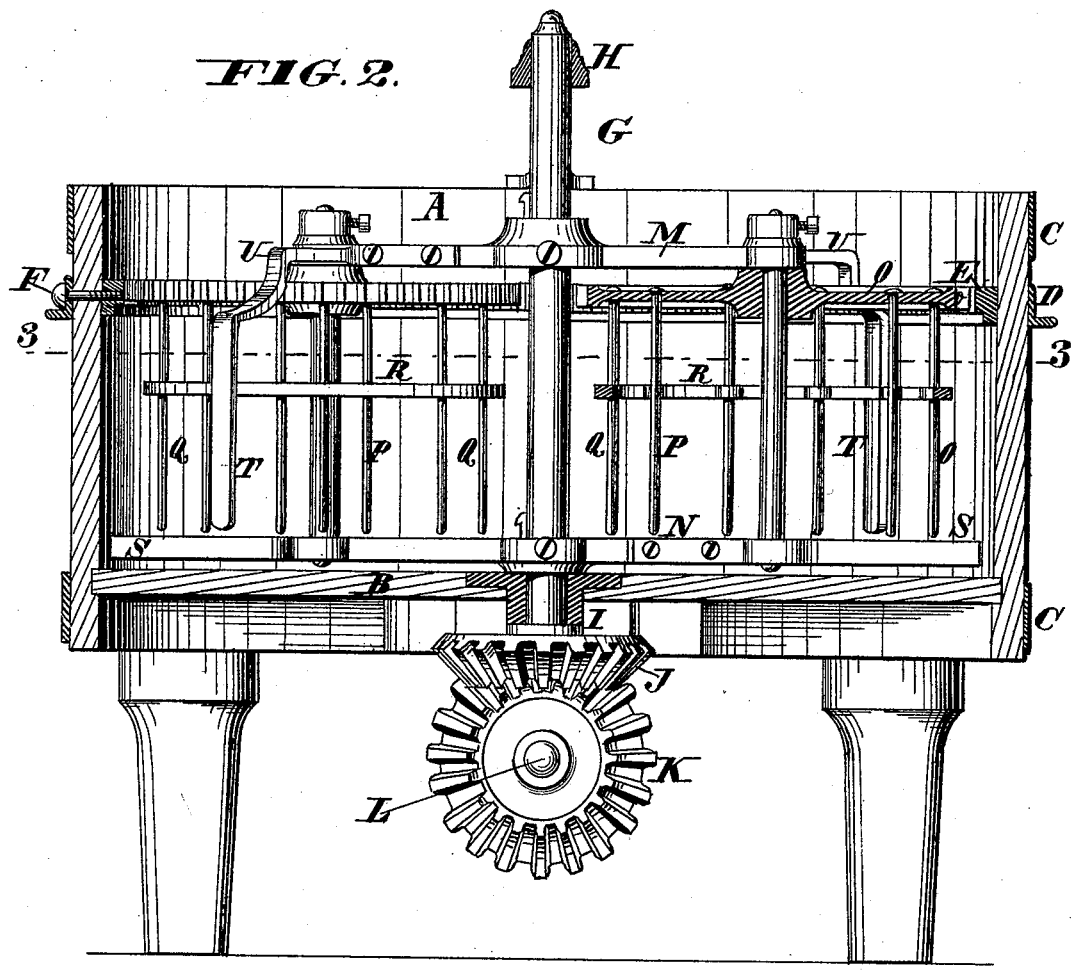
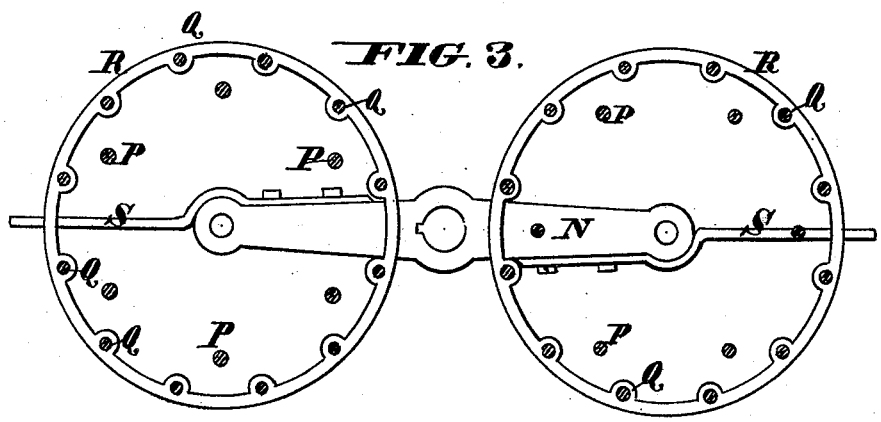
WITNESSES
F. E. Smith
Henry Tanner
INVENTOR
Thomas A. McIntyre
By Knight Bros Attorneys
N. PETERS, PHOTO-LITHOGRAPHER, WASHINGTON, D. C.

UNITED STATES PATENT OFFICE.

THOMAS A. McINTYRE, OF WATERLOO, NEW YORK.

IMPROVEMENT IN MASHING-MACHINES.

Specification forming part of Letters Patent No. 171,832, dated January 4, 1876; application filed May 6, 1875.

*To all whom it may concern:*

Be it known that I, THOMAS A. MCINTYRE, of Waterloo, in the county of Seneca and State of New York, have invented a new and Improved Mashing-Machine, of which the following is a specification:

The machine consists, essentially, of a mash-tub, a vertical shaft, a horizontal frame driven by said shaft, and one, two, or more revolving rakes carried by the rotary frame, and receiving independent rotary motion, or planetary rotation by cogs on the heads of the revolving rakes gearing with a toothed rim within the tub. The rakes may be made with vertical teeth projecting downward from the rake-heads, or with horizontal teeth projecting radially from the vertical shafts of the rakes, or with rings parallel with the rake-heads, and secured thereto at a distance below the same. The revolving frame carries also one or more scrapers or stirrers, which may consist of simple projections from the lower arm of the frame adapted to sweep the bottom of the tub, or of blades projecting vertically from horizontal arms carried by either member of the frame, and adapted to stir the mash behind the revolving rakes, or behind the coiled pipe sometimes used to convey water for cooling the mash. The walls of the tub are composed either of wooden staves or flanged iron sections, surrounded by a hoop of angle-iron, which is connected to the internal cog-rim by bolts passing through the walls.

Figure 1 is a plan view of a mash-tub or machine illustrating my invention. Fig. 2 is a vertical section on the line 2 2, Fig. 1. Fig. 3 is a section on the line 3 3, Fig. 2.

A represents the walls of the tub, composed of staves in the customary manner; and B, the bottom. C C are hoops of common construction. D represents a hoop of angle-iron surrounding the tub near the top. E is a cogged rim encircling the interior of the tub, on the same level as the hoop D, and secured thereto by bolts F passing through the walls of the tub. G is an axial shaft, having its bearings at top in a cross-bar, H, and at bottom in a box, I. To the lower end of the shaft is keyed a bevel-gear, J, meshing with a similar bevel-wheel, K, which is driven by a horizontal shaft, L, connected with any suitable motor. The rotary shaft G drives a frame consisting of two horizontal arms, M N, fixed to the said shaft and carrying at their extremities revolving rakes. O represents the rake-heads, which are formed on their peripheries with cogs o to gear with the cogs e of the rim E. P Q are vertical teeth projecting downward from the rake-heads O nearly to the level of the arms N, which revolve in close proximity to the bottom of the tub. R represents rings attached to the teeth Q, or carried by the rake-heads O through the medium of any other suitable connection. S S are scrapers projecting from the extremities of the arms N, and adapted to sweep the bottom of the tub. T T are vertical scrapers adapted to sweep the sides of the tub. Said scrapers may be connected by arms U with the upper revolving arms M, as shown, or they may be similarly connected with the lower arms N, and project upward from near the bottom of the tub, or similar vertical scrapers may project upward from the extremities of the radial scrapers S.

In constructing the tub of iron instead of wood the sections are formed with flanges, which are bolted together in customary manner.

The shaft L being revolved, a similar rotary movement is communicated to the vertical shaft G, driving the horizontal frame M N, and, by the gearing of the teeth o e, imparting a rapid rotary movement to the rakes O P Q R, as they are carried in their orbit around the axis of the tub. It will thus be seen that the meal or other material at the central portion of the tub, which receives comparatively slight movement from simple rakes as usually made, is in my machine agitated to a greater extent than the other portions, but the stirring action is so effective that all portions of the meal are mingled, and the whole material uniformly agitated. The radial scrapers S prevent any collection of the undisturbed meal on the bottom of the tub. The vertical scrapers T, following the rakes, prevent the accumulation of any material at the sides of the tub.

This apparatus accomplishes the complete saccharification of the meal, and thus effects a large saving of material as compared with machines in common use. By effectively agitating the central portion of the meal, as before stated, it dispenses with the necessity of the use of hand-plungers, which are commonly employed to break away the meal from the bottom while the mash is cooking, but do not successfully prevent the formation of lumps on the bottom of the tub, which, not being thoroughly saccharified, are lost. In my machine not only is there an active motion at the center, but a great variety of motion is obtained, the direction and current being continually broken and the grains of meal being continually washed, so that a new surface is constantly exposed to the action of the scalding water, which liberates the starch and exposes it to the necessary chemical action.

My invention is useful for mixing paints, and for other purposes where thorough mixing is required.

The following is claimed as new:

1. The revolving rakes O, constructed with vertical teeth P Q, and carried by the revolving frame M N, in combination with the surrounding toothed rim E, for imparting rotation to the said rakes, as set forth.

2. The combination of one or more planetary rakes or stirrers and a horizontal scraper, S, for sweeping the bottom of the tub.

3. The combination of one or more planetary rakes or stirrers and one or more teeth or scrapers, T, for sweeping the sides of the tub.

4. The combination of the hoop D and cogged rim E, bolted together through the sides of the tub, substantially as set forth.

THOMAS A. McINTYRE.

Witnesses:
P. J. CURRAN,
GEO. H. WILLIAMSON.